United States Patent
Rus et al.

(10) Patent No.: US 11,285,607 B2
(45) Date of Patent: Mar. 29, 2022

(54) SYSTEMS AND METHODS FOR DISTRIBUTED TRAINING AND MANAGEMENT OF AI-POWERED ROBOTS USING TELEOPERATION VIA VIRTUAL SPACES

(71) Applicant: Massachusetts Institute of Technology, Cambridge, MA (US)

(72) Inventors: Daniela Rus, Weston, MA (US); Jeffrey Lipton, Medford, MA (US); Aidan Fay, La Jolla, CA (US); Changhyun Choi, Minneapolis, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 338 days.

(21) Appl. No.: 16/511,492

(22) Filed: Jul. 15, 2019

(65) Prior Publication Data
US 2020/0016756 A1 Jan. 16, 2020

Related U.S. Application Data

(60) Provisional application No. 62/697,887, filed on Jul. 13, 2018.

(51) Int. Cl.
*B25J 9/16* (2006.01)
(52) U.S. Cl.
CPC ............ *B25J 9/1689* (2013.01); *B25J 9/163* (2013.01)
(58) Field of Classification Search
CPC .......... B25J 9/1689; B25J 9/163; B25J 9/161; G05B 2219/39311; G05B 2219/39536; G05B 2219/40131

USPC .................................................. 700/245–264
See application file for complete search history.

(56) References Cited

U.S. PATENT DOCUMENTS

| | | | | |
|---|---|---|---|---|
| 5,347,459 A | * | 9/1994 | Greenspan | B25J 9/1666 345/424 |
| 8,958,912 B2 | * | 2/2015 | Blumberg | B25J 9/0087 700/259 |
| 8,965,580 B2 | * | 2/2015 | Brooks | G06F 17/00 700/259 |
| 8,996,175 B2 | * | 3/2015 | Blumberg | B25J 13/084 700/259 |

(Continued)

OTHER PUBLICATIONS

Levine S, Pastor P, Krizhevsky A, Ibarz J, Quillen D., Learning hand-eye coordination for robotic grasping with deep learning and large-scale data collection, SAGE, The International Journal of Robotics Research. 2018; vol. 37(Issue 4-5):421-436. doi: 10.1177/0278364917710318 (Year: 2018).*

(Continued)

*Primary Examiner* — Jaime Figueroa
(74) *Attorney, Agent, or Firm* — Wolf, Greenfield & Sacks, P.C.

(57) ABSTRACT

In some aspects, a system comprises a computer hardware processor and a non-transitory computer-readable storage medium storing processor-executable instructions for receiving, from one or more sensors, sensor data relating to a robot; generating, using a statistical model, based on the sensor data, first control information for the robot to accomplish a task; transmitting, to the robot, the first control information for execution of the task; and receiving, from the robot, a result of execution of the task.

18 Claims, 9 Drawing Sheets

(56) References Cited

U.S. PATENT DOCUMENTS

| | | | |
|---|---|---|---|
| 9,643,314 B2* | 5/2017 | Guerin | B25J 9/1605 |
| 9,776,325 B1* | 10/2017 | Hoffmann | B25J 9/1605 |
| 10,310,896 B1* | 6/2019 | Kichak | G06F 9/5027 |
| 10,322,506 B2* | 6/2019 | Ding | B25J 9/163 |
| 10,518,409 B2* | 12/2019 | Oleynik | B25J 11/009 |
| 10,766,137 B1* | 9/2020 | Porter | B25J 9/161 |
| 10,919,152 B1* | 2/2021 | Kalouche | B25J 9/1689 |
| 2011/0288684 A1* | 11/2011 | Farlow | G05D 1/0022 |
| | | | 700/264 |
| 2012/0095619 A1* | 4/2012 | Pack | G05D 1/0038 |
| | | | 701/2 |
| 2012/0215354 A1* | 8/2012 | Krasny | B25J 9/1666 |
| | | | 700/255 |
| 2016/0059412 A1* | 3/2016 | Oleynik | B62D 57/032 |
| | | | 700/257 |
| 2016/0257000 A1* | 9/2016 | Guerin | B25J 9/1605 |
| 2017/0305014 A1* | 10/2017 | Gildert | B25J 9/1664 |
| 2018/0025664 A1* | 1/2018 | Clarke | A63B 69/00 |
| | | | 434/257 |
| 2018/0314936 A1* | 11/2018 | Barik | G06N 5/003 |
| 2019/0232488 A1* | 8/2019 | Levine | G06N 3/08 |
| 2019/0291277 A1* | 9/2019 | Oleynik | B25J 9/1669 |
| 2021/0205986 A1* | 7/2021 | Kalouche | B25J 9/1689 |
| 2021/0237266 A1* | 8/2021 | Kalashnikov | B25J 9/1612 |

OTHER PUBLICATIONS

Brizzi et al, Effects of Augmented Reality on the Performance of Teleoperated Industrial Assembly Tasks in a Robotic Embodiment, 2018, IEEE Transactions on Human-Machine Systems, vol. 48, No. 2, pp. 197-206. (Year: 2018).*

Quillen et al, Deep Reinforcement Learning for Vision-Based Robotic Grasping: A Simulated Comparative Evaluation of Off-Policy Methods, 2018 IEEE International Conference on Robotics and Automation (ICRA) May 21-25, 2018, Brisbane, Australia, pp. 6284-6291. (Year: 2018).*

Lipton et al., Baxter's Homunculus: Virtual Reality Spaces fpr Teleoperation in Manufacturing. IEEE Robotics and Automation Letters. Jan. 2018: 3(1):179-184.

* cited by examiner

SYSTEMS AND METHODS FOR DISTRIBUTED TRAINING AND MANAGEMENT OF AI-POWERED ROBOTS USING TELEOPERATION VIA VIRTUAL SPACES

CROSS-REFERENCE TO RELATED APPLICATIONS

This application claims the benefit under 35 USC 119(e) of: U.S. Provisional Patent Application Ser. No. 62/697,887, filed Jul. 13, 2018, entitled "SYSTEMS AND METHODS FOR DISTRIBUTED TRAINING AND MANAGEMENT OF AI-POWERED ROBOTS USING TELEOPERATION VIA VIRTUAL SPACES," which is incorporated herein by reference in its entirety.

GOVERNMENT SUPPORT

This invention was made with Government support under Grant No. CCF-1138967 awarded by the National Science Foundation (NSF). The Government has certain rights in the invention.

BACKGROUND

In the United States in 2015, young men without a college degree had a 22% unemployment rate, replacing 75% of the time previously spent working with video gaming. At the same time, the United States skills gap is expected to result in two million unfilled jobs in manufacturing in the United States over the next decade. Robotic systems and artificial intelligence (AI) may not be able to fulfill these jobs because of the complexity and variability of contexts they entail. As the world move towards mass customization in manufacturing, the number and complexity of contexts will only grow.

SUMMARY

The inventors have appreciated that scalable teleoperation systems that leverage low skill workers, including their existing gaming skills and ability to adapt to new contexts, may provide a solution to the growing number and complexity of situations, e.g., in manufacturing jobs. A teleoperation system may allow a user to remotely control a system or machine. In some embodiments, the teleoperation system is implemented using virtual reality (VR) to provide a user with a virtual reality control room to pilot a system or machine, e.g., a robot, remotely. In some embodiments, the teleoperation system is scalable and can accommodate a large and variable numbers of users and robots, efficiently utilize user time, and/or have a high task success rate.

In some embodiments, the teleoperation system is implemented based on the Homunculus model of VR-based teleoperation. In the Homunculus model, users are placed inside of virtual controls rooms to pilot a robot remotely. In some embodiments, in order to provide a multi-user multi-robot framework, the user is initially introduced to a virtual reality space where users can oversee multiple robots, see if they are in need of help, and/or log into a robot to take control. By selecting a robot and clicking in the virtual reality space or lobby, the user may take control of the robot and enter a virtual reality control room customized to the robot. While the user is controlling or piloting the selected robot, other users are locked out and may not enter the virtual reality control room or control the selected robot.

In some aspects, a system comprises at least one computer hardware processor and at least one non-transitory computer-readable storage medium storing processor-executable instructions. When executed by the at least one computer hardware processor, the processor-executable instructions cause the at least one computer hardware processor to perform receiving state information relating to one or more robots. Further, the processor-executable instructions cause the at least one computer hardware processor to perform generating, for display to at least one user of a plurality of users, a virtual reality space including the state information for the one or more robots. The user can monitor in the virtual reality space a current state relating to the one or more robots. Further, the processor-executable instructions cause the at least one computer hardware processor to perform receiving, from the user, a selection of one of the one or more robots in the virtual reality space. Further, the processor-executable instructions cause the at least one computer hardware processor to perform generating, for the selected robot, for display to the user, a virtual reality control room for a user to control the selected robot.

In some embodiments, processor-executable instructions for generating for the selected robot the virtual reality control room include processor-executable instructions for generating one or more customized controls in the virtual reality control room based on the selected robot, In some embodiments, the state information relating to the one or more robots is broadcast to the plurality of users.

In some embodiments, control-related information from the selected robot is transmitted only to user controlling the selected robot.

In some embodiments, in response to receiving from the user the selection of one of the one or more robots, other users are prevented from entering the virtual reality control room for the selected robot and controlling the selected robot.

In some embodiments, the state information includes one or more of an identification number, a type, a communication channel, a capability, and the current state relating to the one or more robots.

In some embodiments, the current state for the selected robot includes one of stopped and waiting for help, in autonomous mode, and being operated by the user.

In some embodiments, the current state for the selected robot includes a confidence level and/or an overview image of a current task being handled by the selected robot.

The inventors have appreciated that incorporating automation into a teleoperation system may allow for improved user efficiency. For example, in the case of security robots, unmanned aerial vehicles, and other mobile robots, simple navigation tasks may be completely automated using AI, such as using one or more statistical models. Such statistical models may generate control information to allow robots to grasp objects, tie knots, fold clothes, and other suitable tasks. For example, the statistical model may generate control information, such as a grasp pose, for operating an end effector of the robot, such as an arm. The grasp pose may include a position vector and an orientation vector for operating the end effector of the robot. However, typical teleoperation systems do not do not share control of the robot between the user's control input and control information generated from one or more statistical models.

In some embodiments, a master-apprentice framework is implemented that allows selective control of the robot based on user control input and/or control information from one or more statistical models. Such a framework may deliver high success rates on robot tasks, such as grasping tasks, and allow for efficient use of the user's time. The user may initially monitor the robot's performance based on control information generated from one or more statistical models. The user may intervene and provide user input when the robot is stopped, performing insufficiently, or another instance where the robot is unsuccessful in performing the assigned task. Gradually, as the statistical model learns and develops competency, the user may intervene less and give more autonomy to the robot to operate based on the control information from the statistical model. In some embodiments, the statistical model generates a confidence value for each set of control information. Based on the confidence value being low, e.g., below a threshold, the user may be asked to intervene and provide control input even before executing the control information from the statistical model.

In some aspects, a system comprises at least one computer hardware processor and at least one non-transitory computer-readable storage medium storing processor-executable instructions. When executed by the at least one computer hardware processor, the processor-executable instructions cause the at least one computer hardware processor to perform receiving, from one or more sensors, sensor data relating to a robot. Further, the processor-executable instructions cause the at least one computer hardware processor to perform generating, using a statistical model, based on the sensor data, first control information for the robot to accomplish a task. Further, the processor-executable instructions cause the at least one computer hardware processor to perform transmitting, to the robot, the first control information for execution of the task. Further, the processor-executable instructions cause the at least one computer hardware processor to perform receiving, from the robot, a result of execution of the task.

Further, the processor-executable instructions cause the at least one computer hardware processor to perform, in response to the result of execution of the task being unsuccessful, receiving, from a user, input relating to second control information for the robot to accomplish the task. Further, the processor-executable instructions cause the at least one computer hardware processor to perform transmitting, to the robot, the second control information for execution of the task. Further, the processor-executable instructions cause the at least one computer hardware processor to perform receiving, from the robot, a result of execution of the task. Further, the processor-executable instructions cause the at least one computer hardware processor to perform updating the statistical model based on the sensor data, the second control information, and the result of execution of the task.

In some aspects, a system comprises at least one computer hardware processor and at least one non-transitory computer-readable storage medium storing processor-executable instructions. When executed by the at least one computer hardware processor, the processor-executable instructions cause the at least one computer hardware processor to perform receiving, from one or more sensors, sensor data relating to a robot. Further, the processor-executable instructions cause the at least one computer hardware processor to perform generating, using a statistical model, based on the sensor data, a grasp pose for an end effector of the robot. Further, the processor-executable instructions cause the at least one computer hardware processor to perform transmitting, to the robot, the grasp pose for execution. Further, the processor-executable instructions cause the at least one computer hardware processor to perform receiving, from the robot, a result of execution of the grasp pose.

In some embodiments, the processor-executable instructions cause the at least one computer hardware processor to perform, in response to the result of execution of the grasp pose being unsuccessful, updating a count of unsuccessful executions of grasp poses. Further, the processor-executable instructions cause the at least one computer hardware processor to perform, in response to the count of unsuccessful executions exceeding a threshold, receiving, from a user, input relating to a corrected grasp pose for the end effector of the robot. Further, the processor-executable instructions cause the at least one computer hardware processor to perform transmitting, to the robot, the corrected grasp pose for execution. Further, the processor-executable instructions cause the at least one computer hardware processor to perform receiving, from the robot, the result of execution of the corrected grasp pose. Further, the processor-executable instructions cause the at least one computer hardware processor to perform updating the statistical model based on the sensor data, the corrected grasp pose, and the result of execution of the corrected grasp pose.

In some embodiments, the processor-executable instructions cause the at least one computer hardware processor to further perform, in response to the result of execution of the task being unsuccessful, updating a count of unsuccessful executions of tasks and in response to the count of unsuccessful executions exceeding a threshold, receiving, from the user, the input relating to the second control information for the robot to accomplish the task.

In some embodiments, the processor-executable instructions cause the at least one computer hardware processor to further perform generating, using the statistical model, a confidence value for the first control information and in response to the confidence value not exceeding a confidence threshold, receiving, from the user, the input relating to the second control information for the robot to accomplish the task.

In some embodiments, the processor-executable instructions cause the at least one computer hardware processor to further perform, in response to the confidence value exceeding the confidence threshold, transmitting, to the robot, the first control information for execution of the task.

In some embodiments, the first control information relates to a grasp pose for an end effector of the robot.

In some embodiments, the grasp pose comprises a position vector and an orientation vector for the end effector of the robot.

In some embodiments, the statistical model comprises a convolutional neural network including an input layer, one or more convolution layers, one or more pooling layers, one or more dense layers, and an output layer.

In some embodiments, the result of execution of the task indicates whether execution of the task was successful or unsuccessful.

In some embodiments, the result of execution of the task is based on an indication from a user regarding whether the execution of the task was successful or unsuccessful.

In some embodiments, the task relates to a grasp pose, wherein a torque across an end effector of the robot is measured, and wherein the result of execution of the task is successful or unsuccessful based on whether the measured torque exceeds or does not exceed a torque threshold.

In some embodiments, the sensor data comprises a voxel grid relating to the robot.

In some embodiments, the voxel grid is generated by capturing a three-dimensional point cloud relating to the robot, segmenting the three-dimensional point cloud into one or more object point clouds, and converting the one or more object point clouds into the voxel grid, wherein each voxel in the voxel grid is either occupied or not occupied.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various aspects and embodiments will be described with reference to the following figures. The figures are not necessarily drawn to scale.

DETAILED DESCRIPTION

In some aspects, a VR-based teleoperation or control system that is multi-user and/or multi-robot is provided. In some embodiments, the teleoperation system is implemented based on the Homunculus model of VR-based teleoperation. In the Homunculus model, users are placed inside of virtual controls rooms to pilot a robot remotely. In some embodiments, in order to provide a multi-user multi-robot framework, the user is initially introduced to a virtual reality space where users can oversee multiple robots, see if they are in need of help, and/or log into a robot to take control. By selecting a robot and clicking in the virtual reality space or lobby, the user may take control of the robot and enter a virtual reality control room customized to the robot. While some aspects in the embodiments described herein are described with respect to an exemplary VR-based control system, these aspects and/or embodiments are not so limited and may be equally applicable to any other suitable type of control system, e.g., a VR-based control system, an augmented reality (AR)-based control system, or a mixed VR- and AR-based control system.

In some embodiments, each user and robot may come online and go offline at any point. Each user may switch between VR-based oversight of multiple robots and VR-based control of a single robot. In some embodiments, each type of robot is known a priori, but specifications for each specific robot are not required. In some embodiments, the system provides a virtual reality space or lobby for a user to supervise or oversee multiple robots. In some embodiments, the system provides a virtual reality control room for controlling a robot.

In some embodiments, each user and each robot may be identified with a unique identification (ID) number. Each robot may regularly broadcast its identifying information, e.g., ID number, type, communication channels, capabilities, and/or current state. One or more users may listen for this information. The information may be used to populate a local database of available robots. In some embodiments, robot messages are separated into global and operating messages. Global messages may be received by all users. Operating messages may only be received by the user controlling or piloting the robot. This messaging configuration may allow the system to accommodate large and variable numbers of users and robots.

In some embodiments, each user of the system starts in a virtual reality space or lobby where he or she can see the state information gathered from multiple robots. This may allow the user to engage in oversight of multiple robots simultaneously. The robot is listed as either stopped and waiting for help, in autonomous mode, as being operated by a specific user, or another suitable state. The displayed robot state may include the current confidence level of the task and/or a relevant overview image. By selecting a robot and clicking in the virtual reality space or lobby, the user may take control of the robot and enter a virtual reality control room customized to the robot. While the user is controlling or piloting the selected robot, other users are locked out and may not enter the virtual reality control room or control the selected robot.

Figure 1:
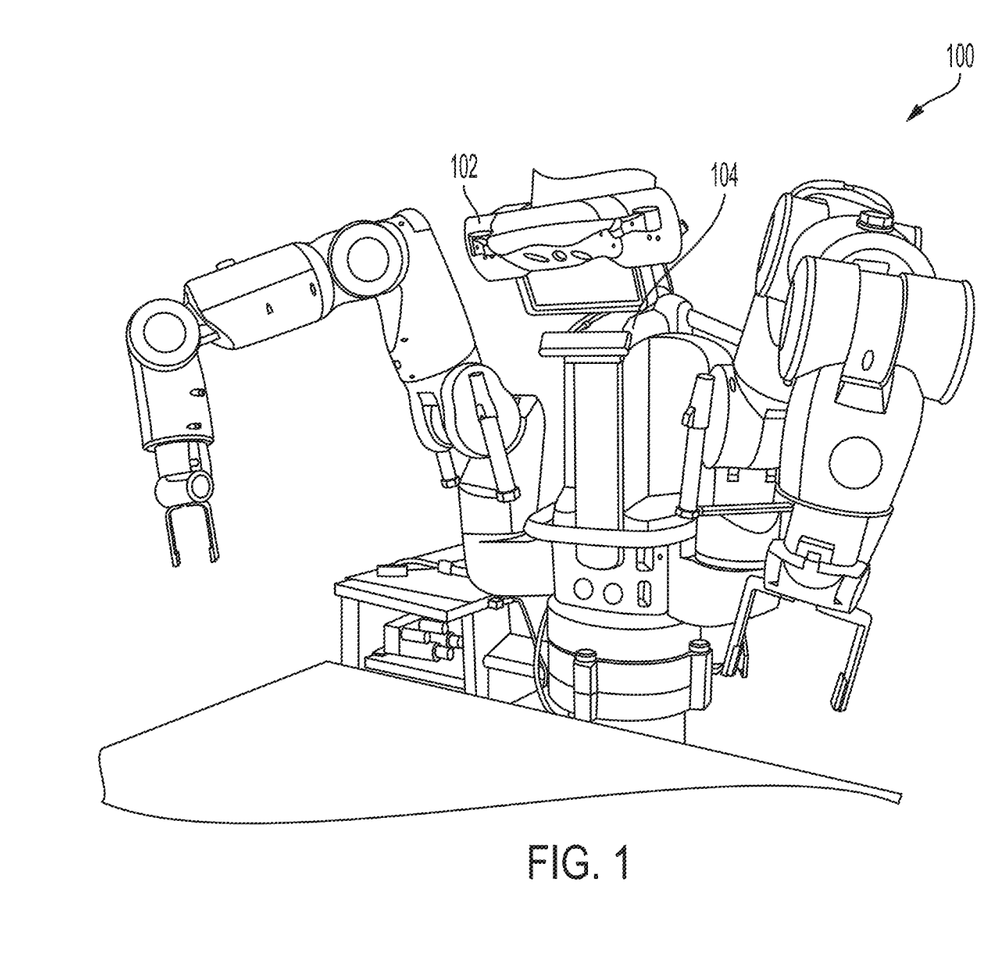
FIG. 1 shows an illustrative robot operated based on control information from a user and/or from a statistical model, in accordance with some embodiments of the technology described herein.
Figure 2:
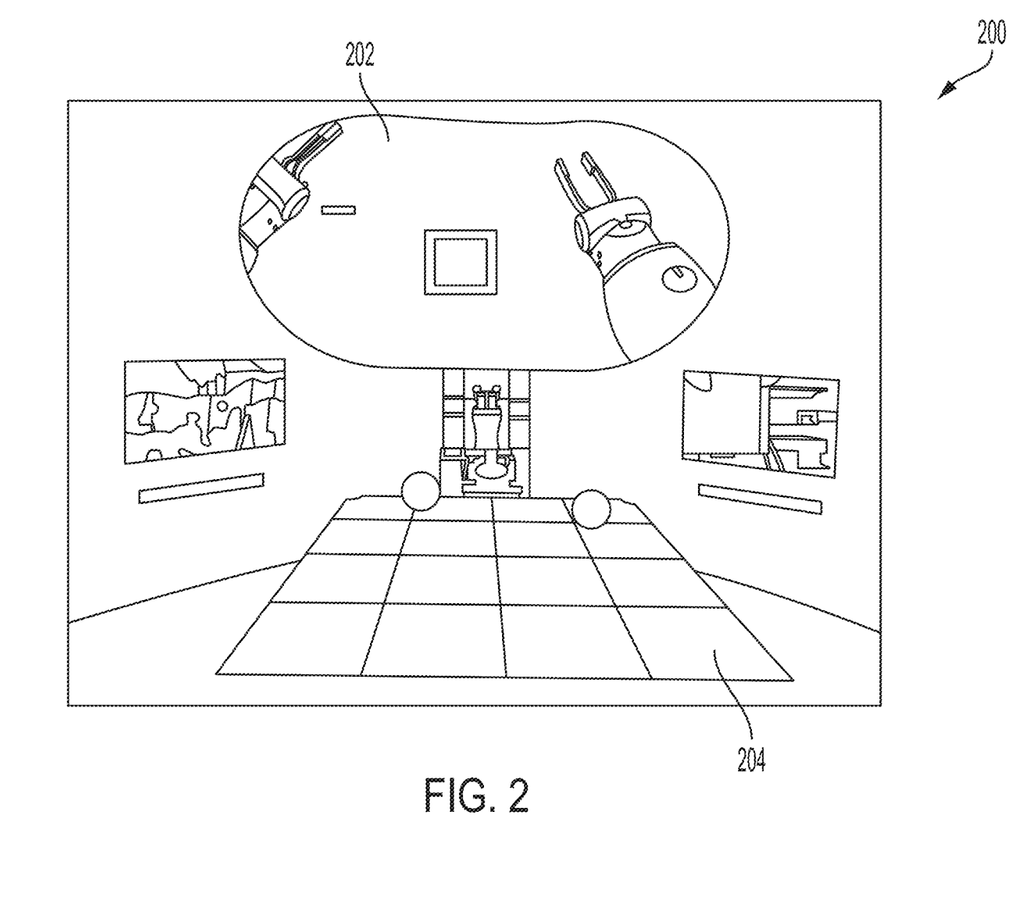
FIG. 2 shows an illustrative virtual reality control room for operating a robot, in accordance with some embodiments of the technology described herein.
Figure 3A:
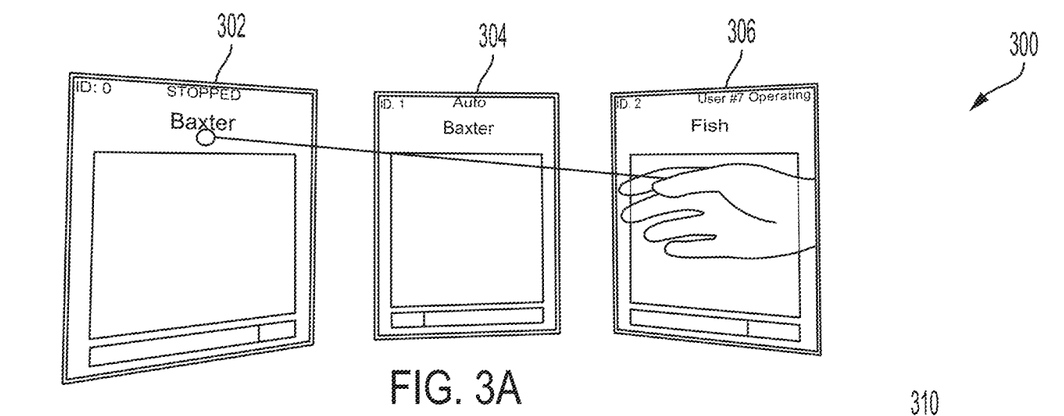
FIGS. 3A-3C shows an illustrative virtual reality space and illustrative virtual reality control rooms, in accordance with some embodiments of the technology described herein.
Figure 3B:
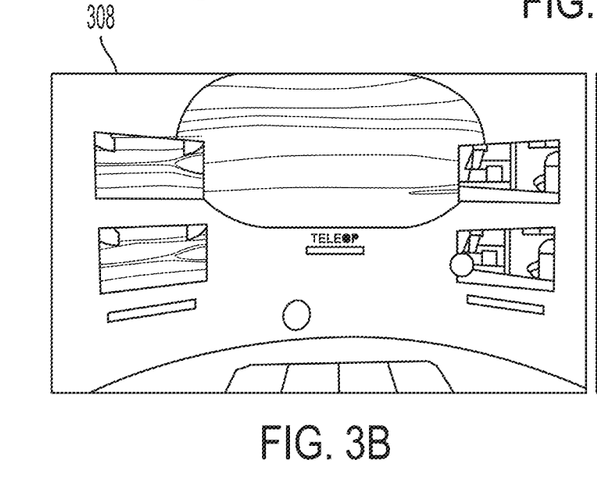
Figure 3C:
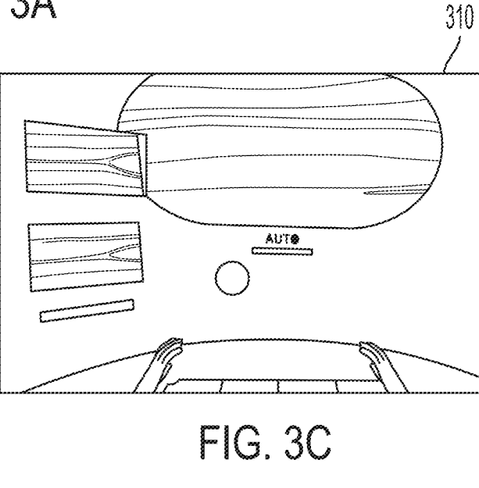

FIG. 1 shows an exemplary BAXTER robot 100. BAXTER is a registered mark of RETHINK ROBOTICS, Boston, Mass., USA. While some aspects in the embodiments described herein are described with respect to an exemplary BAXTER robot, these aspects and/or embodiments are not so limited and may be equally applicable to any other suitable type of robot. FIG. 2 shows an exemplary virtual reality control room 200 for controlling a robot, such as robot 100. FIG. 3A shows an exemplary virtual reality space or lobby 300 where a user can see the state information gathered from multiple robots 302, 304, and 306. In some embodiments, the virtual reality control rooms are customizable, e.g., based on type of robot. For example, information about a specific robot's capabilities may be used to customize the corresponding virtual reality control room for the robot. FIG. 3B shows a control room 308 implemented with left and right arm displays and controls. FIG. 3C shows another control room 310 implemented for a single arm control. Inside the virtual reality control room, the user may pilot the robot or reactivate automated control and observe. In some embodiments, the sensors for each robot respond and plan locally while only transmitting high level state information about the robot to the users for display in the virtual reality space or lobby. In some embodiments, when the user is teleoperating the robot, data from the sensors and user commands or control input are used for on-line learning where the statistical model is updated based on data as it comes in.

In some embodiments, the VR-based control system is at least partially implemented using a computer with an OCULUS RIFT running in the UNITY framework. OCULUS RIFT is a registered mark of FACEBOOK, INC., Menlo Park, Calif., USA. UNITY is a registered mark of UNITY TECHNOLOGIES SF, Copenhagen, Denmark. The UNITY system may communicate through messages, using a library such as LCM or another suitable library for passing messages, to Robot Operating System (ROS) nodes that control the statistical models and the associated robots. Each message sent by a user or a robot may include the corresponding ID number, allowing both sides to discriminate between message sources. Video feeds from a pair of high-definition cameras may be sent using a suitable protocol between a separate computer for each robot and one or more user computers. Further details on aspects of a VR-based teleoperation system may be found in J. I. Lipton, A. J. Fay, and D. Rus, "Baxter's homunculus: Virtual reality spaces for teleoperation in manufacturing," IEEE Robotics and Automation Letters, vol. 3, no. 1, pp. 179-186, 2018, the entirety of which is incorporated herein by reference.

For example, the VR-based control system may implement a virtual reality control room for operating robot 100 in FIG. 1. Robot 100 includes a stereo camera system 102 and a prime-sense camera 104. The stereo camera system 102 provides the user with an overview of the current task being performed by the robot. For example, FIG. 2 shows window 202 showing an overview of the current task being performed by the robot and controls 204 for operating the robot. The prime-sense camera 104 collects RGB-D data for the statistical model. RGB-D image is a combination of a Red-Green-Blue (RGB) image and its corresponding depth (D) image. A depth image is an image channel in which each pixel relates to a distance between the image plane and the corresponding object in the RGB image. Such information may be captured using a KINECT device. KINECT is a registered mark of MICROSOFT CORP., Redmond, Wash., USA.

In some aspects, a master-apprentice framework is used to operate a robot, such as robot 100. The master-apprentice framework may be designed to efficiently utilize user time while ensuring task completion. For example, the robot may ask for a user's help if it cannot find a solution, its confidence levels are too low, or in another suitable instance. This may allow the user to only provide positive examples, while the robot generates its own negative examples through failure.

Figure 7:
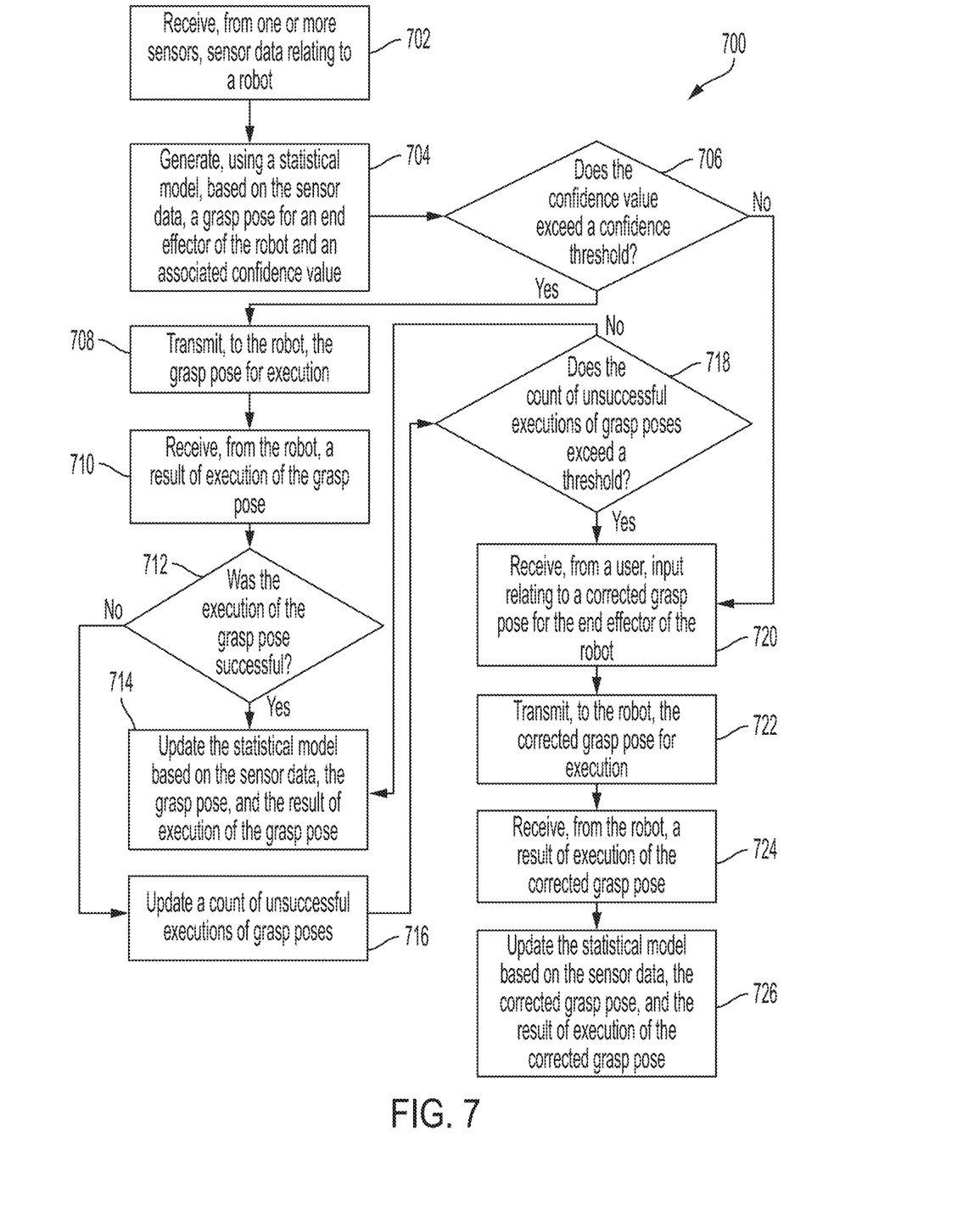
FIG. 7 is a flow chart of another illustrative process for operating a robot using a master-apprentice framework, in accordance with some embodiments of the technology described herein.

In some embodiments, the master-apprentice framework is implemented using the following algorithm. While the following algorithm is described with respect to generating a grasp pose, the algorithm is not so limited and may be equally applicable to generating control information for any suitable task for the robot. FIG. 7 shows an illustrative flow diagram for operating a robot using a master-apprentice framework implemented using the following algorithm.

Data: Statistical Model N
Parameters: number of unsuccessful executions of grasp poses, $n_f$; threshold for number of unsuccessful executions, $t_f$; confidence threshold, $t_p$ Other information: voxel grid, G; grasp pose, g; confidence value, p; reward, r

```
while do {
    G ← perceive( )
    g, p ← N.predict(G)
    if p > t_p then {
        r ← grasp(g)
        if r = 0 then {
            n_f = n_f + 1
        }
        if n_f > t_f then {
            g, r ← human_intervention( )
            n_f ← 0
        }
    }
    else {
        g, r ← human_intervention( )
    }
    N.learn(G, g, r)
}
```

The voxel grid, G, is obtained via a suitable sensor, e.g., prime-sense camera 104. The chosen grasp pose, g, is calculated based on the voxel grid, G, and other suitable information, such as the chosen wrist orientation for the end effector of the robot. Confidence value, p, represents the confidence of the chose grasp, g. The grasp function grasp (g) executes the chosen grasp pose, g, and returns a reward, r, where 0 and 1 mean unsuccessful and successful grasps, respectively. With the reward, r, for the voxel grid, G, and grasp pose, g, the statistical model, N, updates itself, e.g., by updating its weights via back-propagation. As more data is accumulated, the prediction of the statistical model, N, may be more accurate.

As shown in the above algorithm, the robot first predicts a most likely grasp pose, g. If the confidence value, p, of the grasp is higher than the confidence threshold, $t_p$, it executes the grasp pose, g. When the attempted grasping is unsuccessful, the number of unsuccessful executions counter, $n_f$, is increased. If $n_f$ exceeds the threshold for number of unsuccessful executions, $t_f$, or the confidence value, p, is lower than the confidence threshold, $t_p$, the robot asks for the user's help. The system automatically detects if the user has successfully completed the task and learns from the user's solution by updating the statistical model, N. By design, the user need not operate a robot for tasks the statistical model can handle. The user also need not waste time doing the task incorrectly to provide negative feedback to the statistical model. This design may ensure a high task success rate since both the user and the statistical model need to provide unsuccessful grasp poses (and fail to complete the task) for the system for fail.

Figure 6:
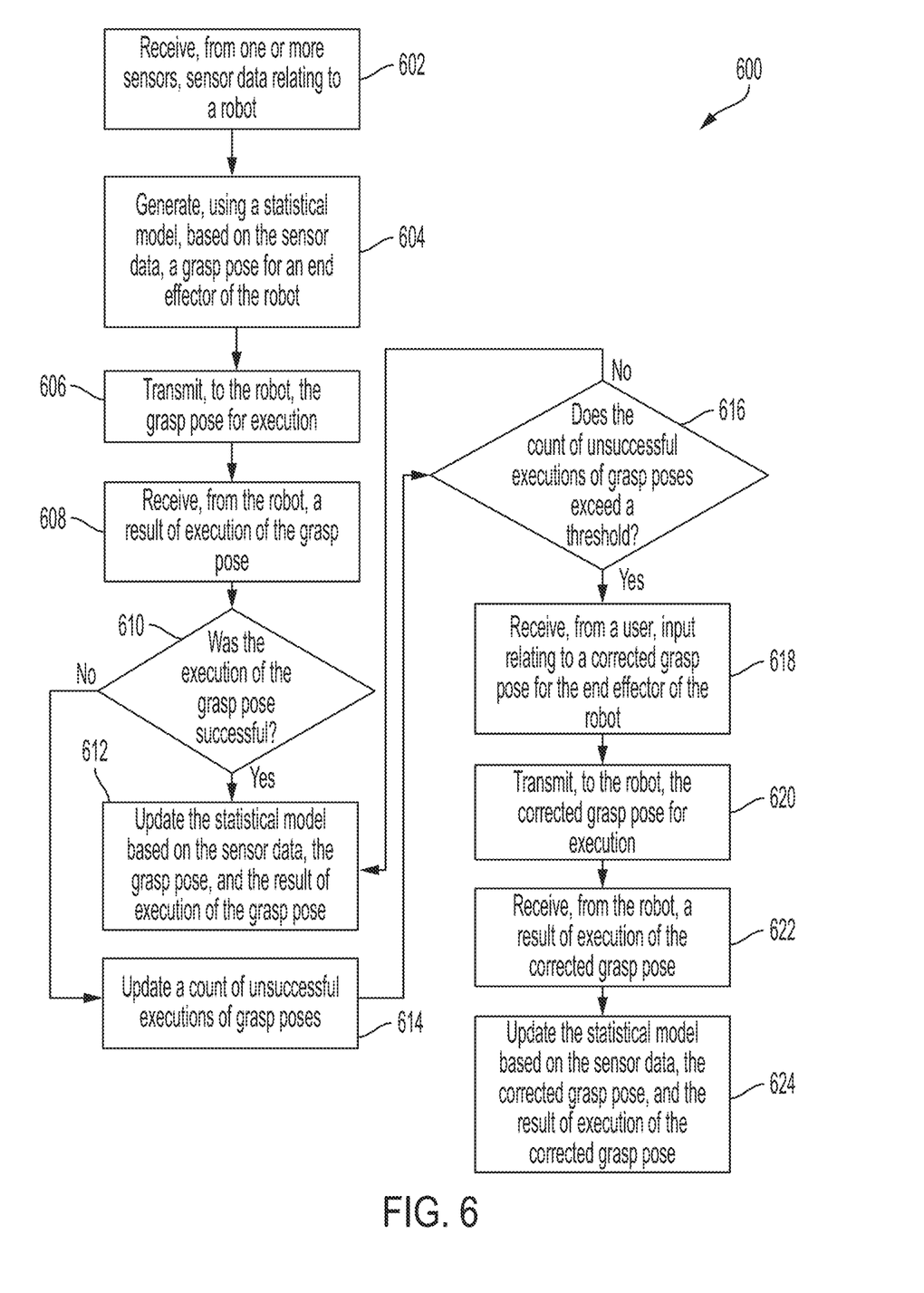
FIG. 6 is a flow chart of an illustrative process for operating a robot using a master-apprentice framework, in accordance with some embodiments of the technology described herein.

In some embodiments, the master-apprentice framework is implemented using the following algorithm. While the following algorithm is described with respect to generating a grasp pose, the algorithm is not so limited and may be equally applicable to generating control information for any suitable task for the robot. FIG. 6 shows an illustrative flow diagram for operating a robot using a master-apprentice framework implemented using the following algorithm.

Data: Statistical Model N
Parameters: number of unsuccessful executions of grasp poses, $n_f$; threshold for number of unsuccessful executions, $t_f$ Other information: voxel grid, G; grasp pose, g; reward, r
```
while do {
    G ← perceive( )
```

-continued

```
    g, p ← N.predict (G)
    r ← grasp(g)
    if r = 0 then {
        n_f = n_f + 1
    }
    if n_f > t_f then {
        g, r ← human_intervention( )
        n_f ← 0
    }
    N.learn (G, g, r)
}
```

In the above shown algorithm, the robot optionally need not generate the confidence value, p, or rely on the confidence threshold, $t_p$, to request the user to intervene. For example, the user may only need to intervene when the number of unsuccessful executions, $n_f$, exceeds the threshold, $t_f$. As shown in the above algorithm, the robot first predicts a most likely grasp pose, g. If the attempted grasping is unsuccessful, the number of unsuccessful executions counter, $n_f$, is increased. If $n_f$ exceeds the threshold for number of unsuccessful executions, $t_f$, or the confidence value, p, is lower than the confidence threshold, $t_p$, the robot asks for the user's help. The system automatically detects if the user has successfully completed the task and learns from the user's solution by updating the statistical model, N.

Figure 4:
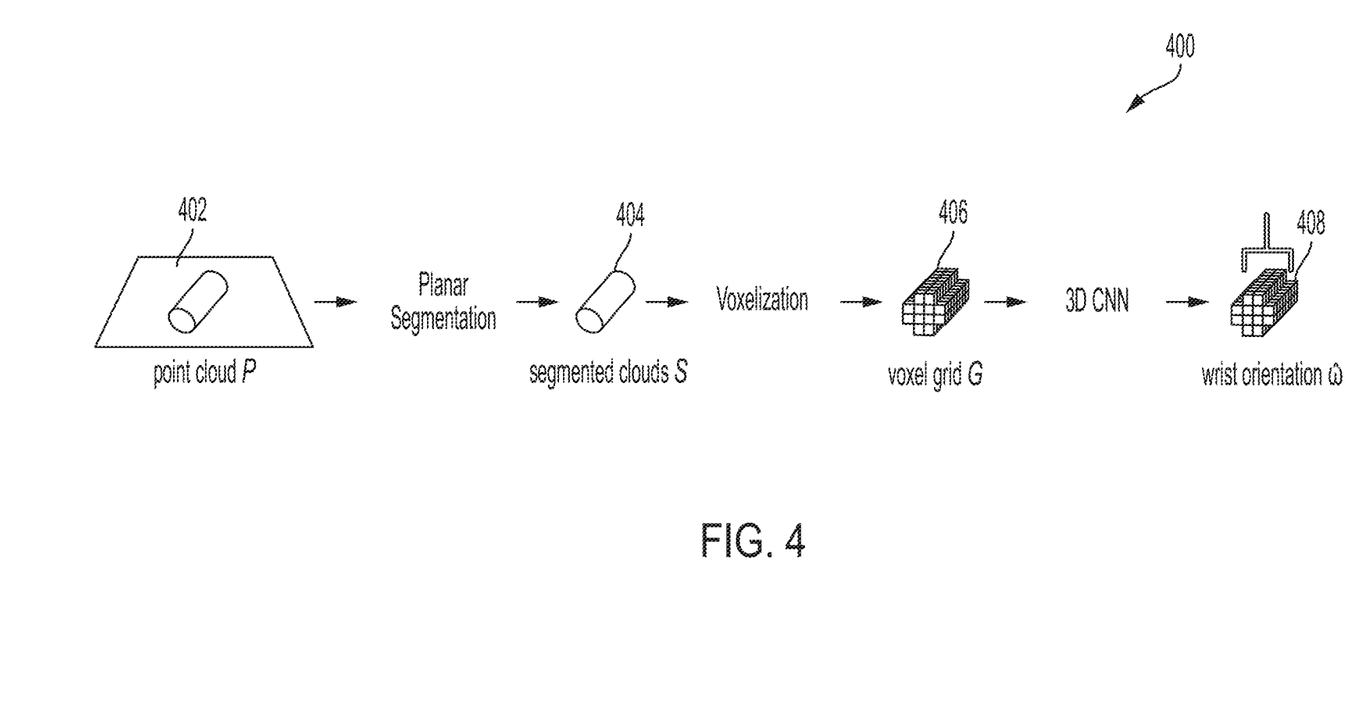
FIG. 4 shows an illustrative pipeline for generating a grasp pose for a robot, in accordance with some embodiments of the technology described herein.

FIG. 4 show an illustrative pipeline 400 for generating a grasp pose. While the illustrative pipeline is described with respect to generating a grasp pose, the pipeline is not so limited and may be equally applicable to generating control information for any suitable task for the robot. The system captures a point cloud 402 and segments object point clouds 404 by fitting the point cloud 402 to the planar background. The segmented point clouds are converted to a 3D voxel grid 406, $G \in Z_g^{N} \cdot {}^{N}_g \cdot {}^{N}_g$, where each voxel in the grid is either −1 (not occupied) or 1 (occupied) and $N_g$ is the edge length of the cubic voxel grid, G. Given G, a statistical model can predict the most likely grasp pose or wrist orientation 408, and the chosen grasp pose or wrist orientation 408 is then executed with the robot. In some embodiments, to determine appropriate grasp poses or wrist orientations given an input point cloud, a statistical model such as a 3D convolutional neural network (CNN) is trained.

Figure 5:
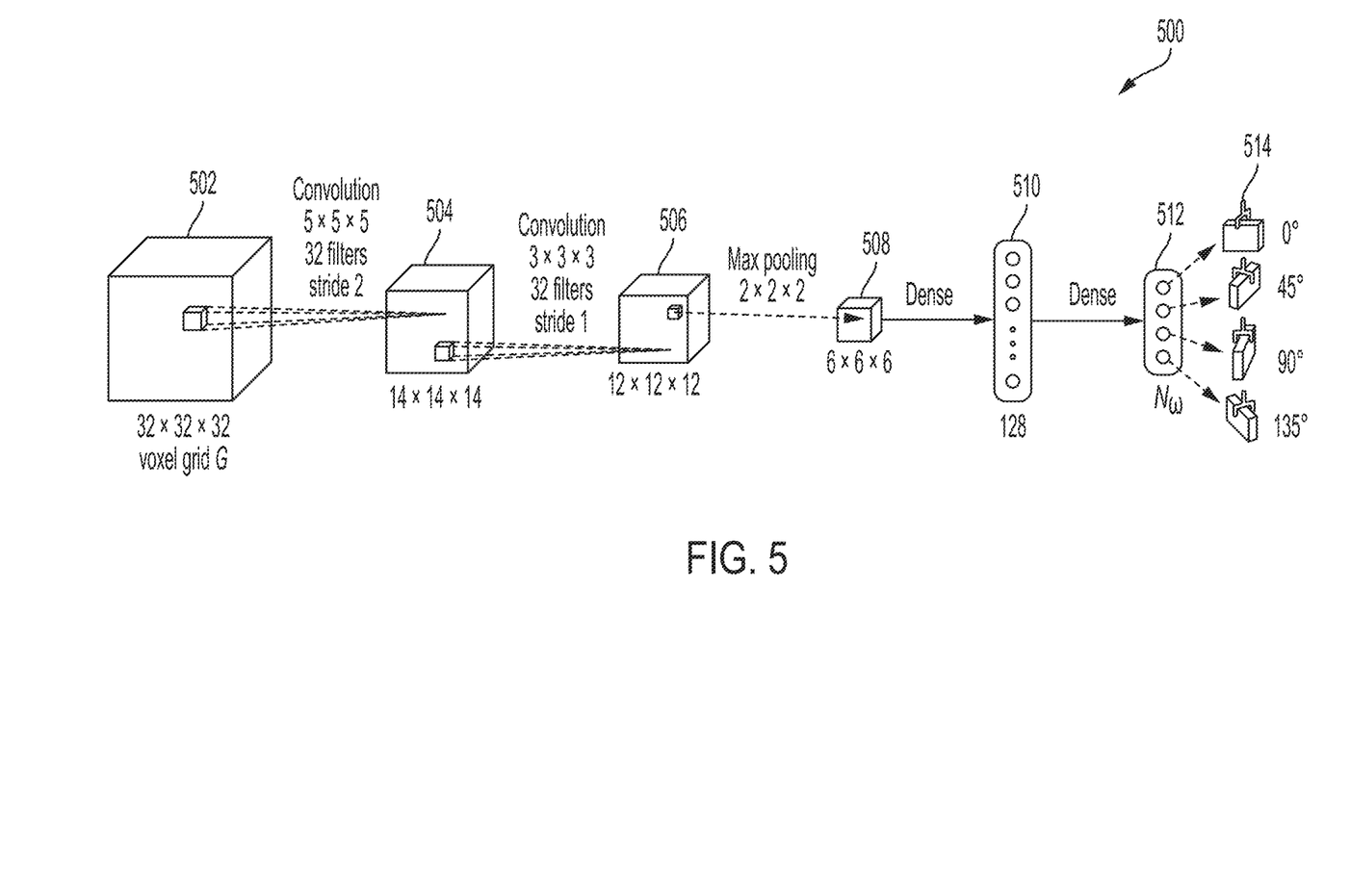
FIG. 5 shows an illustrative convolutional neural network for generating a grasp pose, in accordance with some embodiments of the technology described herein.

FIG. 5 shows the architecture of an illustrative 3D CNN model 500 composed of convolution, pooling, and dense layers. While the CNN model is described with respect to generating a grasp pose, the CNN model is not so limited and may be equally applicable to generating control information for any suitable task for the robot. The input layer 502 is a 32×32×32 3D voxel grid, G, which is voxelized from the raw 3D point cloud. There are two convolution layers 504 and 506 where the first and second layers have 32 filters of 5×5×5 and 3×3×3 size, respectively. After the convolution layers, the data is fed into the max pooling layer 508 of 2×2×2 followed by two dense layers 510 and 512, 128 and $N_\omega$ each. In some embodiments, the output layer 514 is activated via the sigmoid function instead of the softmax function because the output should be $N_\omega$ independent probabilities and not the probability distribution over $N_\omega$ grasp poses or wrist orientations. The loss function is defined by the binary cross-entropy instead of the categorical cross-entropy. In some embodiments, the output in the last layer is not $N_\omega$ dimensional, but $N_\omega$ individual binary output activation. For online grasping learning, the robot may only execute one grasp pose or wrist orientation. Since the robot gets a reward for the tried grasp pose, the loss function may be defined only for the tried grasp and the weights are updated via back propagation for the grasp pose and its corresponding reward.

FIG. 6 is a flow chart of an illustrative process 600 for operating a robot using a master-apprentice framework. Process 600 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. While process 600 is described with respect to generating a grasp pose, process 600 is not so limited and may be equally applicable to generating control information for any suitable task for the robot.

Process 600 begins at act 602, where sensor data is received from one or more sensors relating to a robot. For example, sensor data may be received from prime-sense camera 104 of robot 100. The sensor data may include RGB-D data or other suitable data. Alternatively or additionally, the sensor data may include a voxel grid relating to the robot.

At act 604, part or all of the sensor data, or a processed version thereof, is applied to a statistical model to generate a grasp pose for an end effector of the robot. For example, the convolutional neural network 500 may be used to generate the grasp pose for an arm of robot 100.

At act 606, the grasp pose and/or related information is transmitted to the robot for executing the grasp pose. In some embodiments, the grasp pose includes a position vector and an orientation vector for the end effector of the robot.

At act 608, a result of the execution of the grasp pose is received from the robot. In some embodiments, the result of execution of the grasp pose indicates whether execution of the grasp pose was successful or unsuccessful. The result of execution of the grasp pose may be based on an indication from a user regarding whether the execution of the grasp pose was successful or unsuccessful. Alternatively or additionally, a torque across the end effector of the robot may be measured, and the result of execution of the grasp pose is successful or unsuccessful may be based on whether the measured torque exceeds or does not exceed a torque threshold.

At act 610, it is determined whether the execution of the grasp pose was successful or unsuccessful. If the execution of the grasp pose was successful, process 600 proceeds to act 612. If the execution of the grasp pose was unsuccessful, process 600 proceeds to act 614.

At act 612, the statistical model is updated based on the sensor data, the grasp pose, and the result of execution of the grasp pose. In some embodiments, the statistical model includes a convolutional neural network including an input layer, one or more convolution layers, one or more pooling layers, one or more dense layers, and an output layer. Optionally, process 600 ends or proceeds to act 602.

At act 614, the count of unsuccessful executions is updated to account for the unsuccessful execution of the grasp pose.

At act 616, it is determined whether the count of unsuccessful executions exceeds a threshold number of unsuccessful executions. The threshold may be a predetermined number, specified by a user, automatically generated by the system, or obtained from another suitable source. If the count of unsuccessful executions exceeds the threshold, Process 600 proceeds to act 618. If the count of unsuccessful executions does not exceed the threshold, process 600 proceeds to act 612.

At act 618, user input is received relating to a corrected grasp pose for the end effector of the robot.

At act 620, the corrected grasp pose and/or related information is transmitted to the robot for executing the corrected grasp pose.

At act 622, a result of the execution of the corrected grasp pose is received from the robot.

At act 624, the statistical model is updated based on the sensor data, the corrected grasp pose, and the result of execution of the corrected grasp pose. Optionally, process 600 ends or proceeds to act 602.

FIG. 7 is a flow chart of an illustrative process 700 for operating a robot using a master-apprentice framework. Compared to process 600, process 700 incorporates acts 704 and 706 for generating a confidence value from the statistical model and requesting human intervention based on the confidence value, respectively. Process 700 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. While process 700 is described with respect to generating a grasp pose, process 700 is not so limited and may be equally applicable to generating control information for any suitable task for the robot.

Process 700 begins at act 702, where sensor data is received from one or more sensors relating to a robot. For example, sensor data may be received from prime-sense camera 104 of robot 100. The sensor data may include RGB-D data or other suitable data. Alternatively or additionally, the sensor data may include a voxel grid relating to the robot.

At act 704, part or all of the sensor data, or a processed version thereof, is applied to a statistical model to generate a grasp pose for an end effector of the robot and an associated confidence value. For example, the convolutional neural network 500 may be used to generate the grasp pose for an arm of robot 100 and/or the associated confidence value.

At act 706, it is determined whether the confidence value exceeds a threshold. The threshold may be a predetermined number, specified by a user, automatically generated by the system, or obtained from another suitable source. If the confidence value exceeds the threshold, process 700 proceeds to act 708. If the confidence value does not exceed the threshold, process 700 proceeds to act 720.

At act 708, the grasp pose and/or related information is transmitted to the robot for executing the grasp pose. In some embodiments, the grasp pose includes a position vector and an orientation vector for the end effector of the robot.

At act 710, a result of the execution of the grasp pose is received from the robot. In some embodiments, the result of execution of the grasp pose indicates whether execution of the grasp pose was successful or unsuccessful. The result of execution of the grasp pose may be based on an indication from a user regarding whether the execution of the grasp pose was successful or unsuccessful. Alternatively or additionally, a torque across the end effector of the robot may be measured, and the result of execution of the grasp pose is successful or unsuccessful may be based on whether the measured torque exceeds or does not exceed a torque threshold.

At act 712, it is determined whether the execution of the grasp pose was successful or unsuccessful. If the execution of the grasp pose was successful, process 700 proceeds to act 714. If the execution of the grasp pose was unsuccessful, process 700 proceeds to act 716.

At act 714, the statistical model is updated based on the sensor data, the grasp pose, and the result of execution of the grasp pose. In some embodiments, the statistical model includes a convolutional neural network including an input layer, one or more convolution layers, one or more pooling layers, one or more dense layers, and an output layer. Optionally, process 700 ends or proceeds to act 702.

At act 716, the count of unsuccessful executions is updated to account for the unsuccessful execution of the grasp pose.

At act 718, it is determined whether the count of unsuccessful executions exceeds a threshold number of unsuccessful executions. The threshold may be a predetermined number, specified by a user, automatically generated by the system, or obtained from another suitable source. If the count of unsuccessful executions exceeds the threshold, process 700 proceeds to act 720. If the count of unsuccessful executions does not exceed the threshold, process 700 proceeds to act 714.

At act 720, user input is received relating to a corrected grasp pose for the end effector of the robot.

At act 722, the corrected grasp pose and/or related information is transmitted to the robot for executing the corrected grasp pose.

At act 724, a result of the execution of the corrected grasp pose is received from the robot.

At act 726, the statistical model is updated based on the sensor data, the corrected grasp pose, and the result of execution of the corrected grasp pose. Optionally, process 700 ends or proceeds to act 702.

Figure 8:
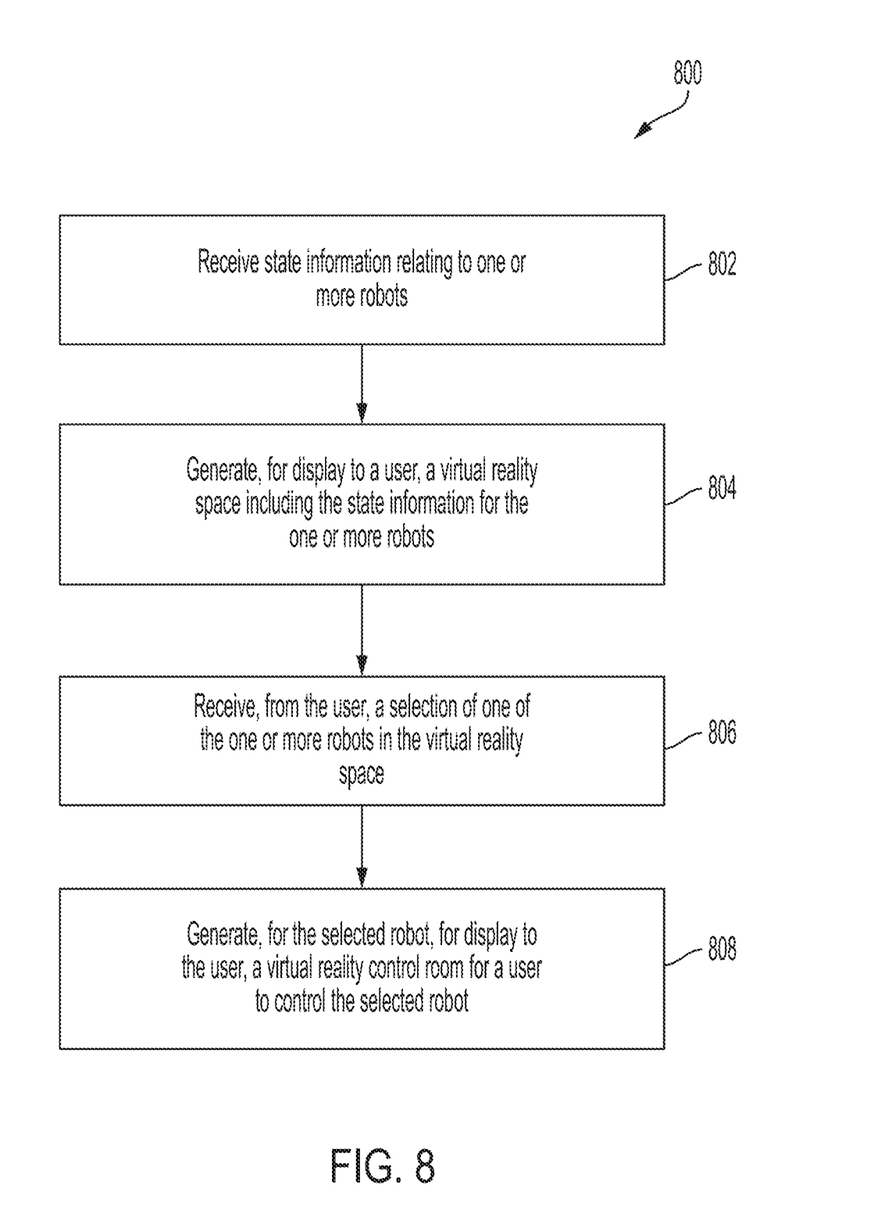
FIG. 8 is a flow chart of an illustrative process for generating a virtual reality space and/or control rooms for a user, in accordance with some embodiments of the technology described herein.

FIG. 8 is a flow chart of an illustrative process 800 for generating a virtual reality space and/or control rooms for a user. Process 800 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect.

At act 802, state information relating to one or more robots is received. For example, state information may be received relating to robot 100. In some embodiments, the state information includes one or more of an identification number, a type, a communication channel, a capability, the current state relating to the one or more robots, and other suitable state information. In some embodiments, the state information relating to the one or more robots is broadcast to the plurality of users.

At act 804, a virtual reality space is generated for display to the user. For example, the virtual reality space or lobby 300 may be generated for display to the user. The virtual reality space includes the state information for the one or more robots. The user can monitor in the virtual reality space a current state relating to the one or more robots. For example, the user can see the state information gathered from multiple robots 302, 304, and 306.

At act 806, a selection of one of the one or more robots in the virtual reality space is received from the user. In some embodiments, the current state for the selected robot includes one of stopped and waiting for help, in autonomous mode, being operated by the user, or another suitable state. In some embodiments, the current state for the selected robot includes a confidence level and/or an overview image of a current task being handled by the selected robot.

At act 808, a virtual reality control room is generated for display to the user. The virtual reality control room may allow a user to control the selected robot. For example, the virtual reality control room 200 may be generated for controlling a robot, such as robot 100. In some embodiments, in response to receiving from the user the selection of one of the one or more robots, other users are prevented from entering the virtual reality control room for the selected robot and controlling the selected robot. In some embodiments, generating for the selected robot the virtual reality control room includes generating one or more customized controls in the virtual reality control room based on the selected robot. In some embodiments, control-related information from the selected robot is transmitted only to user controlling the selected robot.

Figure 9:
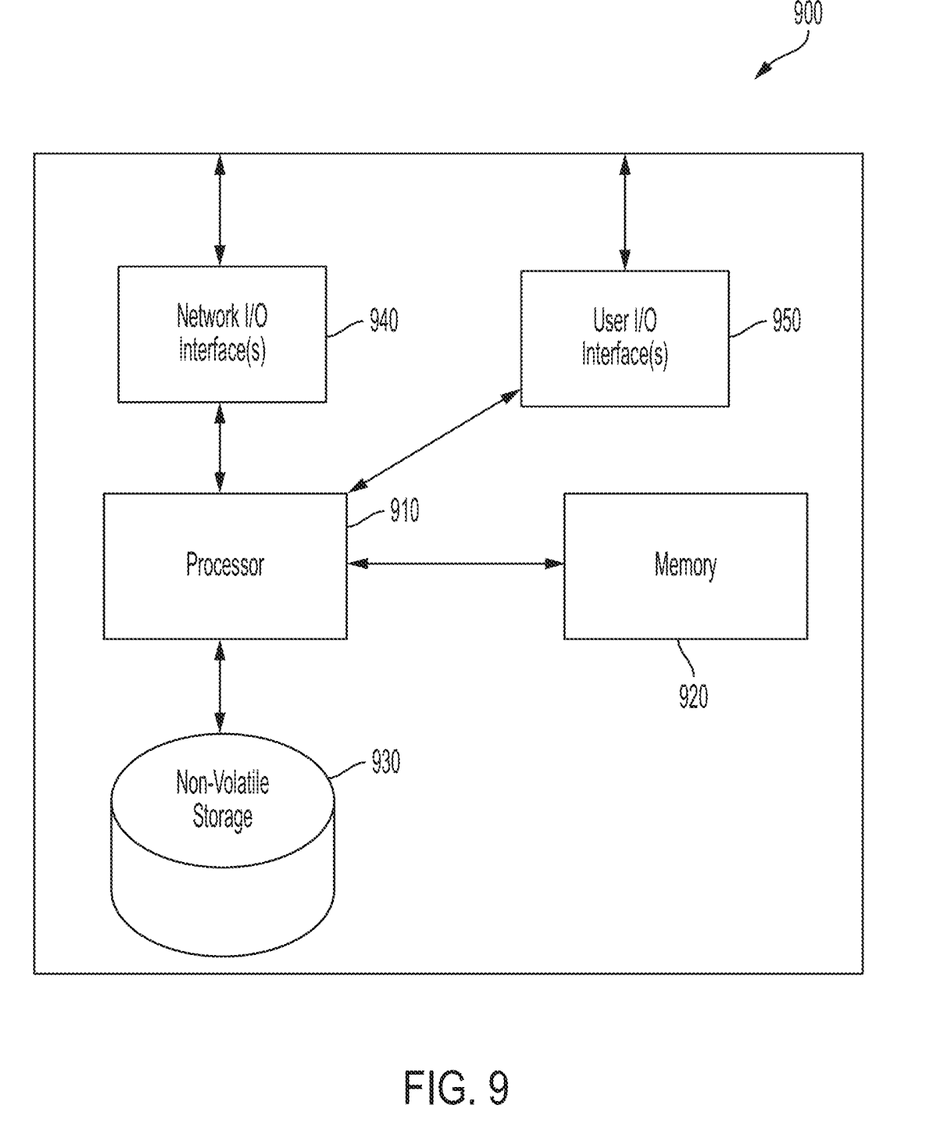
FIG. 9 is a block diagram of an illustrative computer system that may be used in implementing some embodiments of the technology described herein.

An illustrative implementation of a computer system 900 that may be used in connection with any of the embodiments of the technology described herein is shown in FIG. 9. The computer system 900 includes one or more processors 910 and one or more articles of manufacture that comprise non-transitory computer-readable storage media (e.g., memory 920 and one or more non-volatile storage media 930). The processor 910 may control writing data to and reading data from the memory 920 and the non-volatile storage device 930 in any suitable manner, as the aspects of the technology described herein are not limited in this respect. To perform any of the functionality described herein, the processor 910 may execute one or more processor-executable instructions stored in one or more non-transitory computer-readable storage media (e.g., the memory 920), which may serve as non-transitory computer-readable storage media storing processor-executable instructions for execution by the processor 910.

Computing device 900 may also include a network input/output (I/O) interface 940 via which the computing device may communicate with other computing devices (e.g., over a network), and may also include one or more user I/O interfaces 950, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

While some aspects in the embodiments described herein are described with respect to generating a grasp pose, these aspects and/or embodiments are not so limited and may be equally applicable to generating control information for any suitable task for the robot. Further, while some aspects in the embodiments described herein are described with respect to an exemplary BAXTER robot, these aspects and/or embodiments are not so limited and may be equally applicable to any other suitable type of robot. Further, while some aspects in the embodiments described herein are described with respect to an exemplary VR-based control system, these aspects and/or embodiments are not so limited and may be equally applicable to any other suitable type of control system, e.g., a VR-based control system, an AR-based control system, or a mixed VR- and AR-based control system. Any limitations of a particular embodiment described herein are limitations only of the particular embodiment and are not limitations of any other embodiments described herein.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
   at least one computer hardware processor; and
   at least one non-transitory computer-readable storage medium storing processor-executable instructions that, when executed by the at least one computer hardware processor, cause the at least one computer hardware processor to perform:
   receiving, from one or more sensors, sensor data relating to a robot, wherein the sensor data comprises a voxel grid relating to the robot, wherein each voxel in the voxel grid is either occupied or not occupied, wherein the voxel grid is generated by capturing a three-dimensional point cloud relating to the robot, segmenting the three-dimensional point cloud into one or more object point clouds, and converting the one or more object point clouds into the voxel grid;
   generating, using a statistical model, based on the sensor data, first control information for the robot to accomplish a task;
   transmitting, to the robot, the first control information for execution of the task; and
   receiving, from the robot, a result of execution of the task.

2. The system of claim 1, wherein the processor-executable instructions cause the at least one computer hardware processor to further perform:
   in response to the result of execution of the task being unsuccessful:
   receiving, from a user, input relating to second control information for the robot to accomplish the task;
   transmitting, to the robot, the second control information for execution of the task;
   receiving, from the robot, the result of execution of the task; and
   updating the statistical model based on the sensor data, the second control information, and the result of execution of the task.

3. The system of claim 2, wherein the processor-executable instructions cause the at least one computer hardware processor to further perform:
   in response to the result of execution of the task being unsuccessful:
   updating a count of unsuccessful executions of tasks; and
   in response to the count of unsuccessful executions exceeding a threshold, receiving, from the user, the input relating to the second control information for the robot to accomplish the task.

4. The system of claim 2, wherein the processor-executable instructions cause the at least one computer hardware processor to further perform:
   generating, using the statistical model, a confidence value for the first control information;
   in response to the confidence value not exceeding a confidence threshold, receiving, from the user, the input relating to the second control information for the robot to accomplish the task; and in response to the confidence value exceeding the confidence threshold, transmitting, to the robot, the first control information for execution of the task.

5. The system of claim 1, wherein the first control information relates to a grasp pose for an end effector of the robot.

6. The system of claim 5, wherein the grasp pose comprises a position vector and an orientation vector for the end effector of the robot.

7. The system of claim 1, wherein the statistical model comprises a convolutional neural network including an input layer, one or more convolution layers, one or more pooling layers, one or more dense layers, and an output layer.

8. The system of claim 1, wherein the result of execution of the task indicates whether execution of the task was successful or unsuccessful.

9. The system of claim 8, wherein the result of execution of the task is based on an indication from a user regarding whether the execution of the task was successful or unsuccessful.

10. The system of claim 8, wherein the task relates to a grasp pose, wherein a torque across an end effector of the robot is measured, and wherein the result of execution of the task is successful or unsuccessful based on whether the measured torque exceeds or does not exceed a torque threshold.

11. At least one non-transitory computer-readable storage medium storing processor-executable instructions that, when executed by at least one computer hardware processor, cause the at least one computer hardware processor to perform:
receiving, from one or more sensors, sensor data relating to a robot, wherein the sensor data comprises a voxel grid relating to the robot, wherein each voxel in the voxel grid is either occupied or not occupied, wherein the voxel grid is generated by capturing a three-dimensional point cloud relating to the robot, segmenting the three-dimensional point cloud into one or more object point clouds, and converting the one or more object point clouds into the voxel grid;
generating, using a statistical model, based on the sensor data, first control information for the robot to accomplish a task;
transmitting, to the robot, the first control information for execution of the task; and
receiving, from the robot, a result of execution of the task.

12. The computer-readable storage medium of claim 11, wherein the processor-executable instructions cause the at least one computer hardware processor to further perform:
in response to the result of execution of the task being unsuccessful:
receiving, from a user, input relating to second control information for the robot to accomplish the task;
transmitting, to the robot, the second control information for execution of the task;
receiving, from the robot, the result of execution of the task; and
updating the statistical model based on the sensor data, the second control information, and the result of execution of the task.

13. The computer-readable storage medium of claim 12, wherein the processor-executable instructions cause the at least one computer hardware processor to further perform:
in response to the result of execution of the task being unsuccessful:
updating a count of unsuccessful executions of tasks; and
in response to the count of unsuccessful executions exceeding a threshold, receiving, from the user, the input relating to the second control information for the robot to accomplish the task.

14. The computer-readable storage medium of claim 12, wherein the processor-executable instructions cause the at least one computer hardware processor to further perform:
generating, using the statistical model, a confidence value for the first control information;
in response to the confidence value not exceeding a confidence threshold, receiving, from the user, the input relating to the second control information for the robot to accomplish the task; and
in response to the confidence value exceeding the confidence threshold, transmitting, to the robot, the first control information for execution of the task.

15. The computer-readable storage medium of claim 11, wherein the first control information relates to a grasp pose for an end effector of the robot, wherein the grasp pose comprises a position vector and an orientation vector for the end effector of the robot.

16. The computer-readable storage medium of claim 11, wherein the result of execution of the task indicates whether execution of the task was successful or unsuccessful, wherein the result of execution of the task is based on an indication from a user regarding whether the execution of the task was successful or unsuccessful.

17. The computer-readable storage medium of claim 11, wherein the result of execution of the task indicates whether execution of the task was successful or unsuccessful, wherein the task relates to a grasp pose, wherein a torque across an end effector of the robot is measured, and wherein the result of execution of the task is successful or unsuccessful based on whether the measured torque exceeds or does not exceed a torque threshold.

18. A method, comprising:
receiving, from one or more sensors, sensor data relating to a robot, wherein the sensor data comprises a voxel grid relating to the robot, wherein each voxel in the voxel grid is either occupied or not occupied, wherein the voxel grid is generated by capturing a three-dimensional point cloud relating to the robot, segmenting the three-dimensional point cloud into one or more object point clouds, and converting the one or more object point clouds into the voxel grid;
generating, using a statistical model, based on the sensor data, first control information for the robot to accomplish a task;
transmitting, to the robot, the first control information for execution of the task; and
receiving, from the robot, a result of execution of the task.

* * * * *